United States Patent
Chang

(10) Patent No.: US 8,018,529 B2
(45) Date of Patent: Sep. 13, 2011

(54) CAMERA MODULE

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 375 days.

(21) Appl. No.: 12/347,293

(22) Filed: Dec. 31, 2008

(65) Prior Publication Data

US 2010/0013985 A1   Jan. 21, 2010

(30) Foreign Application Priority Data

Jul. 15, 2008 (CN) .......................... 2008 1 0302751

(51) Int. Cl.
*H04N 5/225* (2006.01)
(52) U.S. Cl. ....................................... 348/374; 348/342
(58) Field of Classification Search .......... None
See application file for complete search history.

(56) References Cited

U.S. PATENT DOCUMENTS

| | | | |
|---|---|---|---|
| 2004/0165095 A1* | 8/2004 | Shimizu et al. | 348/335 |
| 2005/0013018 A1* | 1/2005 | Ning | 359/784 |
| 2005/0231812 A1* | 10/2005 | Leu et al. | 359/642 |
| 2005/0276467 A1* | 12/2005 | Chen | 382/152 |
| 2006/0132926 A1* | 6/2006 | Leu | 359/642 |
| 2006/0181633 A1* | 8/2006 | Seo | 348/340 |
| 2007/0045550 A1* | 3/2007 | Nakajo et al. | 250/370.08 |
| 2007/0258006 A1* | 11/2007 | Olsen et al. | 348/345 |
| 2008/0042333 A1* | 2/2008 | Kim | 269/71 |
| 2008/0100910 A1* | 5/2008 | Kim et al. | 359/356 |

FOREIGN PATENT DOCUMENTS

KR   10-0843475 B1   7/2008
* cited by examiner

*Primary Examiner* — Lin Ye
*Assistant Examiner* — Dennis Hogue
(74) *Attorney, Agent, or Firm* — Altis Law Group, Inc.

(57) ABSTRACT

An exemplary camera module includes a barrel, a holder engaged with the barrel, a first lens received in the barrel, an image sensor received in the holder and a second lens received in the holder. The holder includes an inner chamber. The second lens is mounted on the holder proximate to the image sensor. The second lens is configured for preventing dust accessing into the inner chamber. The second lens includes a main body and an infrared cut film formed on and in contact with an outside surface of the main body or embedded within the main body.

9 Claims, 7 Drawing Sheets

CAMERA MODULE

BACKGROUND

1. Technical Field

The present invention relates to optical imaging devices and, particularly, to a camera module.

2. Discussion of Related Art

Currently, with the development of electronic devices having multiple functions, image pick-up apparatuses have been widely used in a variety of consumer electronic devices, such as cellular telephones, notebook computers, digital cameras, personal digital assistants (PDAs), etc. In the meantime, demand for improving image quality is increasing, which essentially depends on the quality of a camera module of the image pick-up apparatus. Accordingly, a camera module with high resolution and image quality is desired.

Referring to FIG. 7, a typical camera module 100 includes a holder 11, a barrel 12, a plurality of lenses 13 received in the barrel 12 and an image sensor 14 arranged in the holder 11. Usually, the camera module 100 further includes an infrared cut filter 15 for preventing infrared light disturbing the image sensor 14 and a glass cover 16 for preventing dusts from falling on the image sensor 14. However, the infrared cut filter 15 and the glass cover 16 will take up some space of the holder 11 which is not suitable for the camera module 100 to be compact.

Therefore, what is needed is a camera module capable of overcoming the described limitations.

BRIEF DESCRIPTION OF THE DRAWINGS

Many aspects of the present camera module can be better understood with reference to the following drawings. The components in the drawings are not necessarily to scale, the emphasis instead being placed upon clearly illustrating the principles of the present camera module. Moreover, in the drawings, like reference numerals designate corresponding parts throughout the several views.

DETAILED DESCRIPTION OF EMBODIMENTS

Reference will now be made to the drawings to describe in detail of the exemplary embodiment of the camera module.

Figure 1:
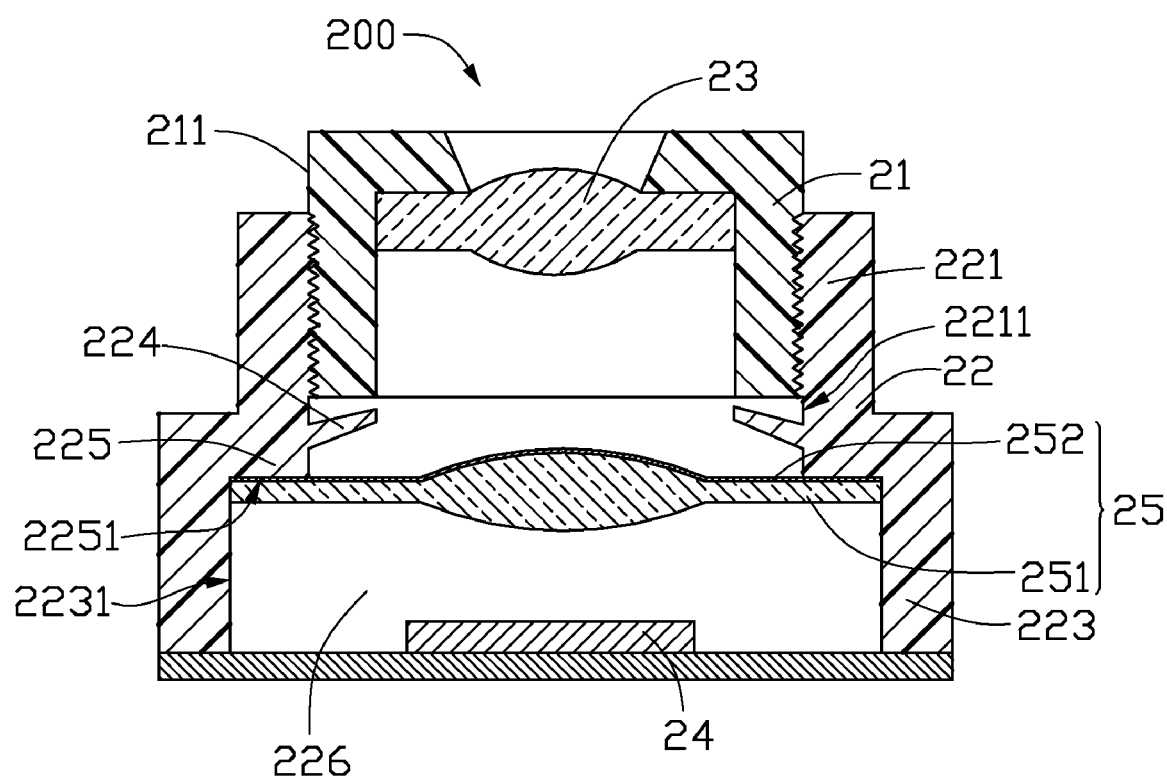
FIG. 1 is a schematic, cross-sectional view of a camera module in accordance with a first embodiment.

Referring to FIG. 1, a camera module 200, in accordance with the first embodiment, includes a barrel 21, a holder 22 engaged with the barrel 21, a first lens 23 received in the barrel 21, an image sensor 24 received in the holder 22, and a second lens 25 received in the holder 22.

The barrel 21 is a hollow cylinder, including an inner wall and an outer wall 211. The outer wall 211 has screw threads for mounting the barrel 21 to the holder 22. The barrel 21 is configured for receiving optical elements, such as lenses, spacers or other optical elements. The barrel 21 may be made of plastic materials, such as polyethylene, polypropylene, polyvinyl chloride or polystyrene.

The holder 22 is a hollow cylinder with a top portion 221 and a bottom portion 223. The top portion 221 is configured for engaging with the barrel 21, and partly receiving the barrel 21. The top portion 221 includes an inner surface 2211. A plurality of screw threads is formed on the inner surface 2211 for fixing the barrel 21 to the holder 22. It should be understood that the barrel 21 also can be fixed in the holder 22 by adhering. In the present embodiment, the cross-sectional shape of the top portion is round. The bottom portion 223 of the holder 22 has an inner chamber 226 for receiving the image sensor 24. The cross-sectional shape of the bottom portion 223 is rectangular. It should be understood that the shape of the holder 22 can also be other shapes depending on the practical need. The holder 22 may be made of plastic materials, such as polyethylene, polypropylene, polyvinyl chloride and polystyrene.

The image sensor 24 is arranged in the bottom portion 223 of the holder 22 and is configured for receiving the light beams converged by the first and second lenses 23, 25 in the barrel 21.

The second lens 25 is arranged in the bottom portion 223 of the holder 22 above the image sensor 24. The second lens 25 includes a main body 251 and an infrared cut film 252. The second lens 25 is provided for obviate the need of arranging a transparent plate in the holder 22 to prevent contamination of the image sensor 24. The infrared cut film 252 can be formed on the main body 251 or embedded within the main body 251 (see FIG. 2). The second lens 25 is adjoined to the image sensor 24, which means no other optical elements exit between the second lens 25 and the image sensor 24.

Figure 3:
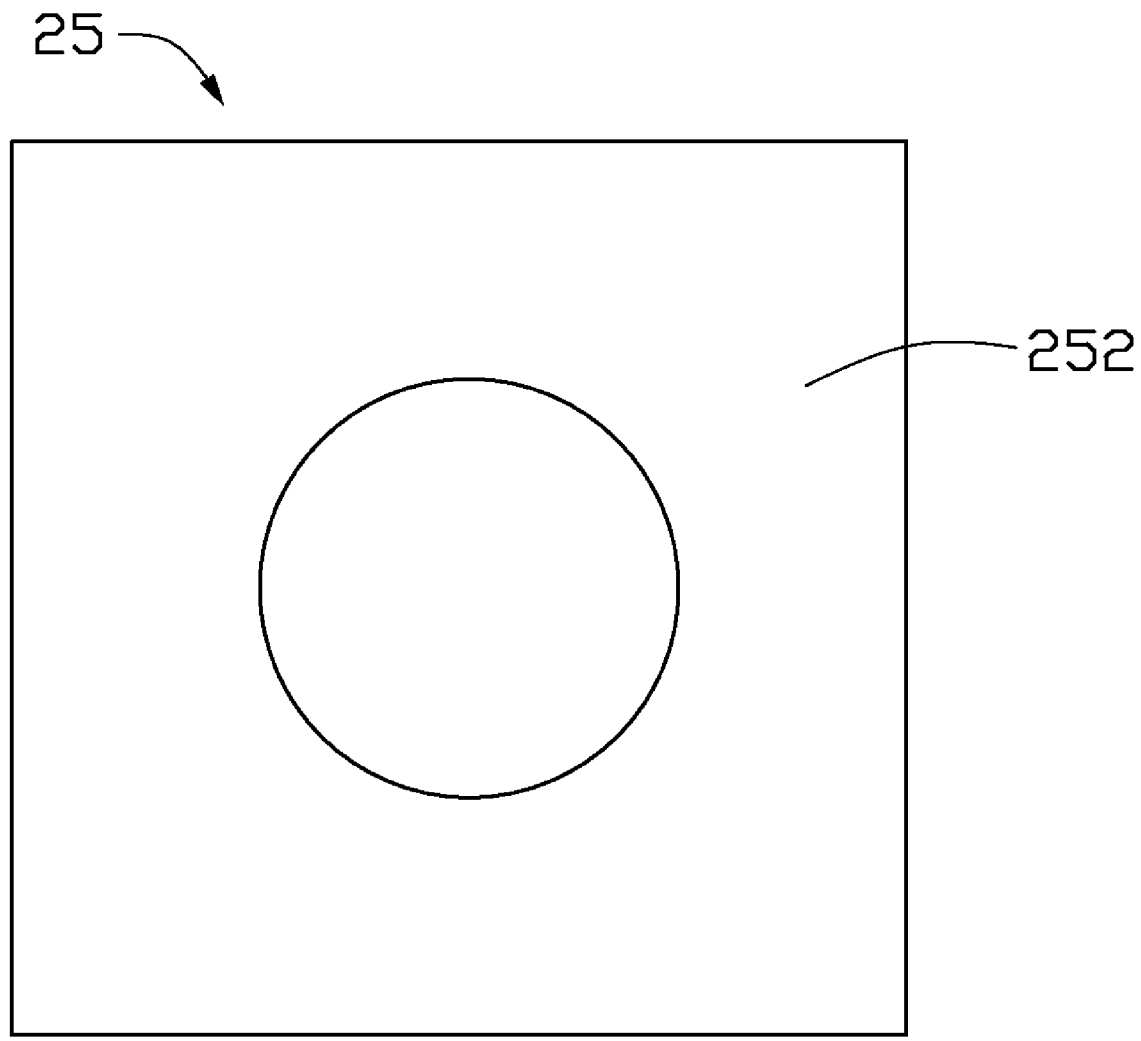
FIG. 3 is a schematic, top view of a second lens in the camera module of FIG. 1.

In the present embodiment, the infrared cut film 252 may be formed on the main body 251 either on a top surface of the main body 251 facing the barrel 21 or on a bottom surface of the main body 251 facing the image sensor 24. Alternatively, the infrared filter film 252 can be formed embedded within the main body 251 by using an insert molding method. The shape of the main body 252 is rectangular which is cooperated with that of the bottom portion 223 of the holder 22 (see FIG. 3). When the bottom portion 223 of the holder 22 is chosen as an annular shape, the main body 252 of the second lens 25 could be round in the shape.

The second lens 25 can be produced using injection molding method by the following steps. Firstly, the main body 251 of the second lens 25 is produced by injection molding machine; secondly, the infrared cut film 252 is coated on one surface of the main body 251 by evaporation coating device or sputter coating device. Then, the second lens 25 can be produced.

The second lens 25 is adhered to the inner surface 2231 of the bottom portion 223 of the holder 22. In the present embodiment, the holder 22 includes a step 225, and the second lens 25 is also adhered to the bottom surface 2251 of the step 225.

To protect the second lens 25, an annular protrusion 224 is formed on the inner surface 2211 of the top portion 221 of the barrel 22 between the second lens 25 and the barrel 21. The annular protrusion 224 can prevent small fragments or dusts from falling down to the second lens 25 when the barrel 21 is threadedly coupled to the holder 22, or prevent glue from falling down to the second lens 25 when the barrel 21 is fixed to the holder 22 via the glue.

The second lens 25 is arranged in the holder 22, which can reduce the number of the lenses 23 in the barrel 21 and then reduce the height of the barrel 21. The second lens 25 also can prevent the image sensor 23 from being polluted by dusts, replacing the glass cover 16 of the camera module 100 in the prior art. Furthermore, the second lens 25 includes an infrared cut film 252, so an additional infrared cut filter can be removed. The second lens 25 has the function of an optical lens, an infrared cut filter and a glass cover, so the camera module 200 with the second lens 25 can be more compact. Moreover, because the infrared cut filter and the glass cover are removed, the assembly of the camera module 200 can be greatly simplified and the time and cost of assembly can be greatly reduced.

Figure 4:
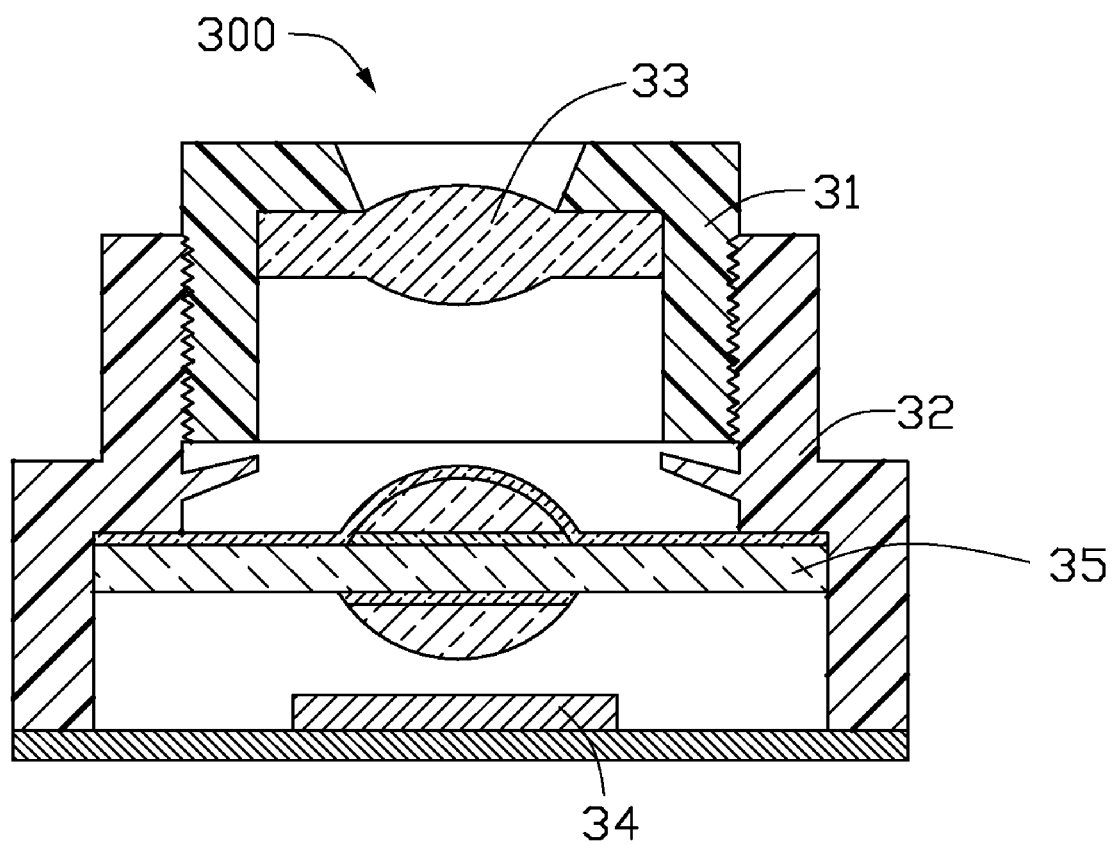
FIG. 4 is a schematic, cross-sectional view of a camera module in accordance with a second embodiment.

Referring to FIG. 4, a camera module 300, in accordance with the second embodiment, includes a barrel 31, a holder 32 engaged with the barrel 31, a first lens 33 received in the barrel 31, an image sensor 34 received in the holder 32, and a second lens 35 received in the holder 32. The camera module 300 is similar with the camera module 200 in the first embodiment except the structure of the second lens 35.

Figure 5:
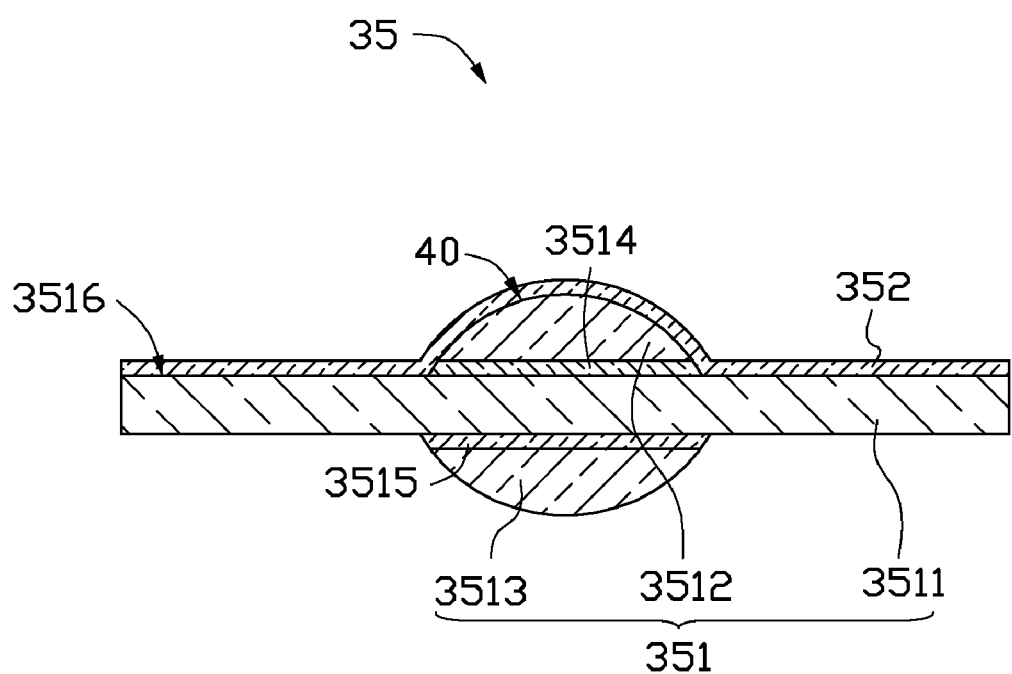
FIG. 5 is a schematic, cross-sectional view of a second lens in the camera module of FIG. 4.

Referring to FIG. 5, the second lens 35 includes a main body 351 and an infrared cut film 352. The main body 351 includes a flat portion 3511 and two curving portions 3512, 3513. The flat portion 3511 includes two opposite surfaces, and the two curving portions 3512, 3513 are respectively formed on the two surfaces of the flat portion 3511.

The main body 351 can be produced using a nano-imprinting method. Firstly, the flat portion 3511 is provided. Secondly, the curving portion 3512 is formed on one surface of the flat portion 3511 using the nano-imprinting method. Thirdly, the flat portion 3511 is turned over and the curving portion 3513 is formed on an opposite surface of the flat portion 3511. Lastly, the main body 351 is done.

To avoid total reflection at the interfaces of the flat portion 3511 and the two curving portions 3512, 3513, the second lens 35 further includes two multi-layer films 3514, 3515 respectively sandwiched between the flat portion 3511 and the two curving portions 3512, 3513. The multi-layer films 3514, 3515 have the same structure each of which includes a plurality of low refractive index layers and high refractive index layers when each low refractive index layer and each high refractive layer are alternately stacked one on another. Such that, the total reflection at the interfaces of the flat portion 3511 and the two curving portions 3512, 3513 can be reduced or eliminated.

Figure 2:
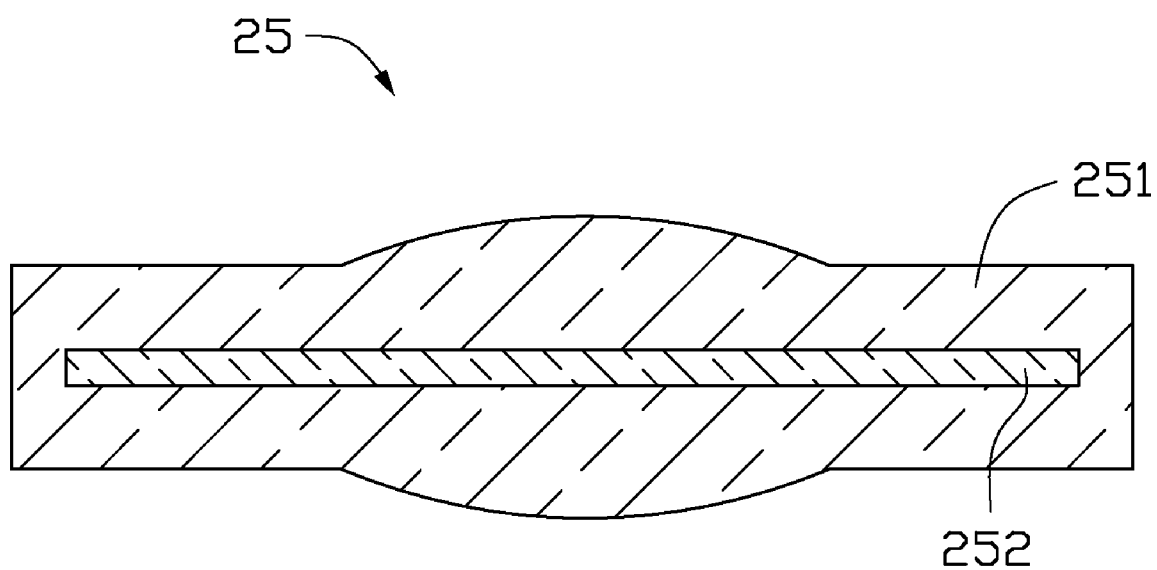
FIG. 2 is a schematic, cross-sectional view of a second lens in the camera module of FIG. 1.
Figure 6:
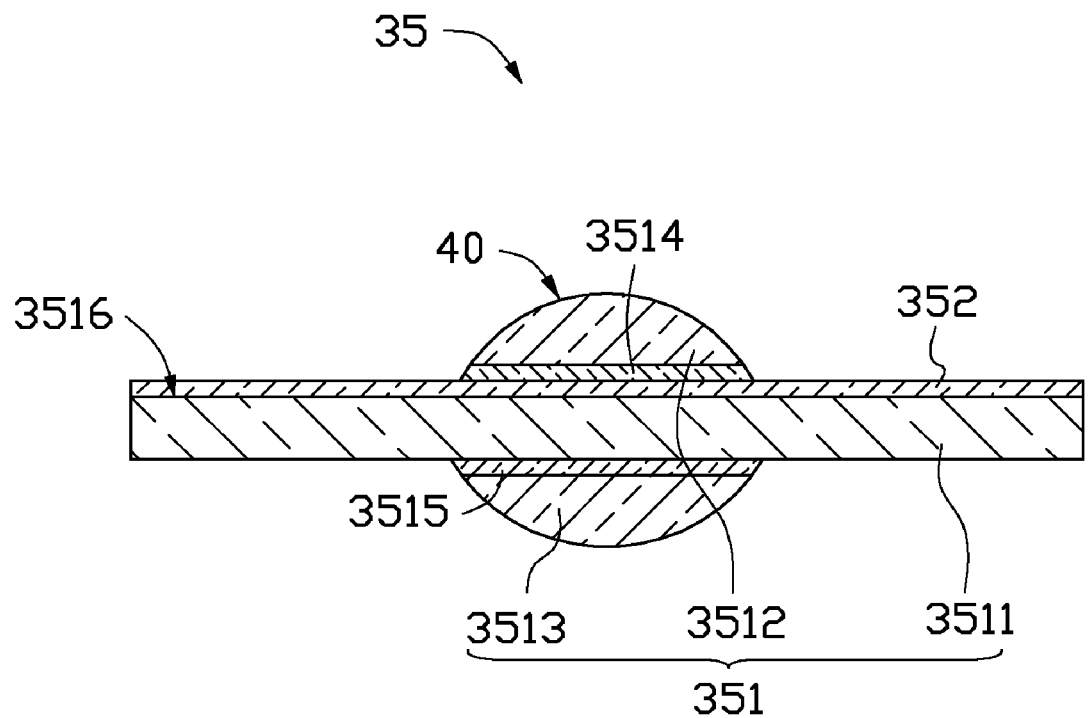
FIG. 6 is a schematic, cross-sectional view of a second lens in the camera module of FIG. 4.
Figure 7:
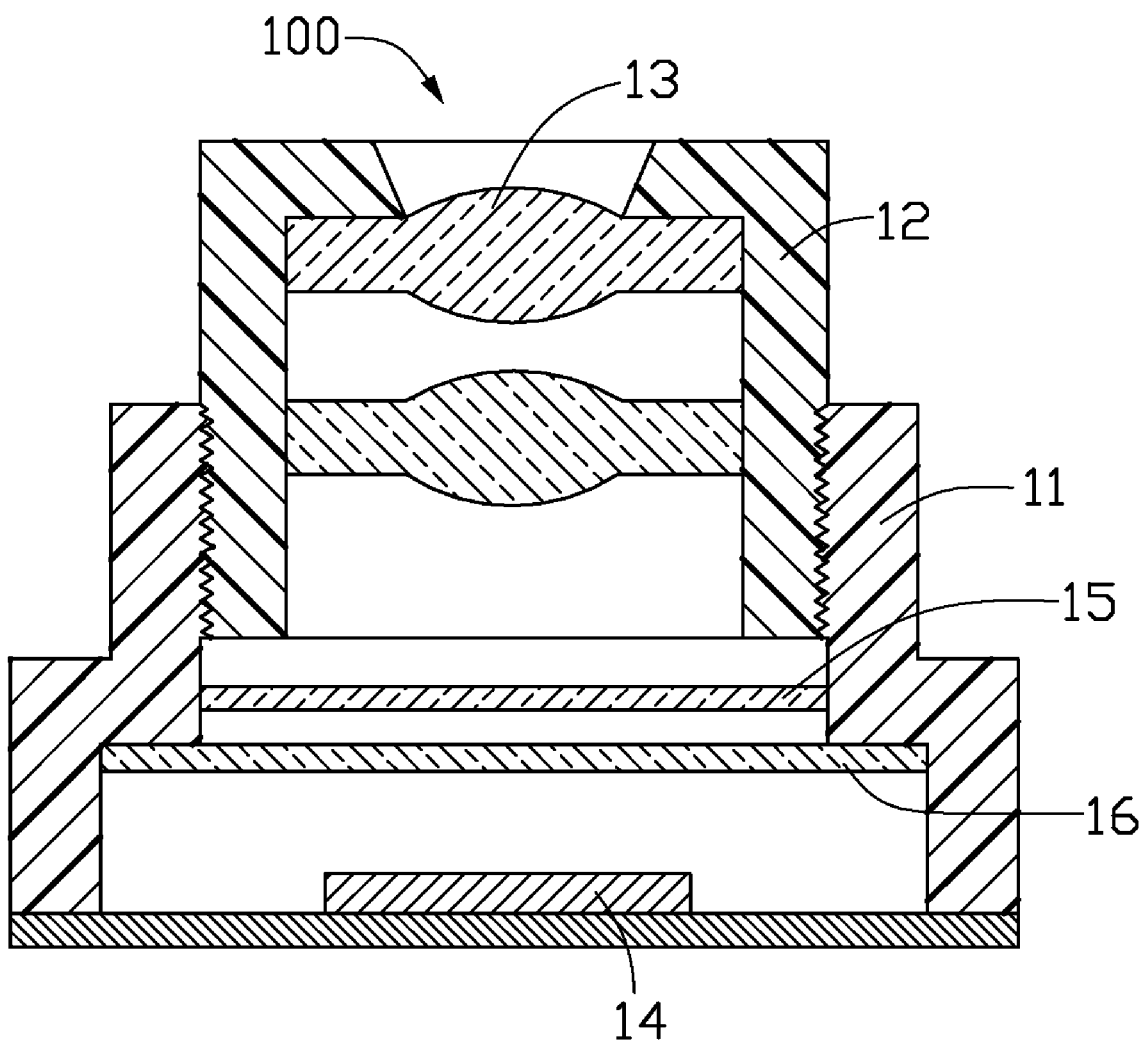
FIG. 7 is a schematic, cross-sectional view of a typical camera module.

The infrared cut film 352 is coated on one surface of the main body 351. It may be coated after the main body 351 is produced. That is to say, a part of the infrared cut filter 352 is formed on an outer surface 40 of the curving portion 3512 and rest of the infrared cut filter 352 is formed on the peripheral portion 3516 of the flat portion 3511. Alternatively, the infrared cut film 352 may be coated directly on one surface of the flat portion 3511 before the curving portion 3512 or the curving portion 3513 is formed on the surface (see FIG. 6). It should be understood that, the infrared cut film 352 may be formed inside the flat portion 3511 of the main body 351 similar with the structure as shown in FIG. 2.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A camera module comprising:
a barrel;
a holder engaged with the barrel, the holder comprising an inner chamber;
a first lens received in the barrel;
an image sensor received in the inner chamber of the holder; and
a second lens mounted on the holder proximate to the image sensor, the second lens being configured for preventing dust accessing into the inner chamber, the second lens comprising a main body and an infrared cut film formed on and in contact with an outside surface of the main body or embedded within the main body, wherein the main body comprises a flat portion and two curving portions, the two curving portions being respectively formed on opposite surfaces of the flat portion, wherein the second lens further comprises two multi-layer films respectively sandwiched between the flat portion and the two curving portions, and the two multi-layer films have the same structure each of which includes a plurality of low refractive index layers and high refractive index layers when each low refractive index layer and each high refractive layer are alternately stacked one on another.

2. The camera module of claim 1, wherein the holder further comprises an inner surface and an annular protrusion formed on the inner surface of the holder, and the annular protrusion is arranged between the second lens and the barrel.

3. The camera module of claim 2, wherein the annular protrusion slants to the inner surface of the holder.

4. The camera module of claim 1, wherein the main body comprises an aspherical surface.

5. The camera module of claim 1, wherein the barrel is threadedly engaged with the holder.

6. The camera module of claim 1, wherein both of the multi-layer films are directly formed on the opposite surfaces of the flat portion, and the curving portions are directly formed on the respective multi-layer films.

7. The camera module of claim 6, wherein the infrared cut film is in contact with an outside surface of one of the two curving portions, a peripheral portion of the corresponding multi-layer film, and a corresponding surface of the flat portion.

8. The camera module of claim 1, wherein the infrared cut film is directly formed on one of the opposite surfaces of the flat portion, one of the multi-layer films is directly formed on the infrared cut film, the other one of the multi-layer films is directly formed on the other one of the opposite surfaces of the flat portion, and the curving portions are directly formed on the respective multi-layer films.

9. A camera module comprising:
a barrel;
a holder engaged with the barrel, the holder comprising an inner surface;
a first lens received in the barrel;
an image sensor received in the holder; and
a second lens mounted on the inner surface of the holder proximate to the image sensor, the second lens being configured for protecting the image sensor from outside dusts, the second lens comprising a main body and an infrared cut film formed on and in contact with an outside surface of the main body or embedded within the main body, wherein the main body comprises a flat portion and two curving portions, the two curving portions being respectively formed on opposite surfaces of the flat portion, wherein the second lens further comprises two multi-layer films respectively sandwiched between the flat portion and the two curving portions, and the two multi-layer films have the same structure each of which includes a plurality of low refractive index layers and high refractive index layers when each low refractive index layer and each high refractive layer are alternately stacked one on another.

* * * * *